US008150716B1

(12) United States Patent
Lunsford et al.

(10) Patent No.: US 8,150,716 B1
(45) Date of Patent: Apr. 3, 2012

(54) WEBSITE AND METHOD FOR SEARCH ENGINE OPTIMIZATION BY PROMPTING, RECORDING AND DISPLAYING FEEDBACK OF A WEB SITE USER

(75) Inventors: Joseph R. Lunsford, Alpharetta, GA (US); Mark R. Ziler, Decatur, GA (US)

(73) Assignee: Worldwide Creative Techniques, Inc. (VG)

( * ) Notice: Subject to any disclaimer, the term of this patent is extended or adjusted under 35 U.S.C. 154(b) by 1235 days.

(21) Appl. No.: 11/849,494

(22) Filed: Sep. 4, 2007

Related U.S. Application Data

(63) Continuation of application No. 10/284,550, filed on Oct. 29, 2002, now abandoned.

(51) Int. Cl.
*G06F 17/30* (2006.01)

(52) U.S. Cl. ...................................................... 705/7.11

(58) Field of Classification Search .................. 705/7.11
See application file for complete search history.

(56) References Cited

U.S. PATENT DOCUMENTS

| 6,029,195 | A  | * | 2/2000  | Herz ............................. 725/116 |
| 6,324,538 | B1 | * | 11/2001 | Wesinger et al. ..................... 1/1 |
| 7,562,112 | B2 | * | 7/2009  | Harrow et al. ................ 709/203 |
| 2005/0120042 | A1 | * | 6/2005 | Shuster et al. ................ 707/102 |

* cited by examiner

*Primary Examiner* — Romain Jeanty
(74) *Attorney, Agent, or Firm* — Carlineo, Spicer & Kee, LLC

(57) ABSTRACT

The invention provides a web site with content designed to elicit responses from users that contain keyword dense content for a chosen word or words. Users submit responses to the website and the website displays the responses on a web page. The accumulation of targeted and keyword specific material in natural language as recorded and displayed on the web site attracts search engine spiders and achieve a higher ranking in response to key word searches matching the keyword dense content.

20 Claims, 2 Drawing Sheets

FIG. 2

```
Meta Tags (for Spiders):
Title: Widget Sales and Maintenance Discussion
Description: Discuss where to buy widgets, how to maintain your
widgets, and other widget-related topics.
Keywords: widget, widgets, buy widgets, shop for widgets, shopping
for widgets, widget maintenance, widget replacement parts...
```

- 5 Title
- 6 Description
- 7 Keywords

| Discount on Widgets! | Sign up for our Widget Maintenance Newsletter | Search for Widgets Here |

8     9     10

- Green Widgets (11)
- Blue Widgets (12)
- Red Widgets (13)
- Small Widgets (14)
- Large Widgets (15)

Message Board Thread with Multiple Posts *16*

- Does anyone have any advice on where to buy widgets? I'm thinking of buying a widget and learning how to maintain widgets.

- Yes, I own three widgets and I tutor people in my city on widget maintenance. The most important thing to keep in mind when shopping for widgets is to find a source with good selection of different widget brands.

- The best place for shop for widgets is at widget-world.com. They've got different colored widgets, and a good variety of widget sizes and brands.

- If the main lever of your widget breaks, what's the best way to get the widget working again? Where can you buy widget replacement parts?

17 Post Reply    18 Login or Register to Post Messages    19 Other Discussion Topics

WEBSITE AND METHOD FOR SEARCH ENGINE OPTIMIZATION BY PROMPTING, RECORDING AND DISPLAYING FEEDBACK OF A WEB SITE USER

CROSS REFERENCE TO RELATED APPLICATION

This application is a continuation of U.S. patent application Ser. No. 10/284,550, filed Oct. 29, 2002, now abandoned and entitled Website and Method for Search Engine Optimization by Prompting, Recording and Displaying Feedback of a Web Site User, the entire disclosure of which is incorporated herein by reference.

FIELD OF INVENTION

This invention relates to the promotion and marketing of products and services on web sites over the Internet. More particularly, this invention relates to the use of user feedback to web site content to optimize the web site's search engine ranking.

DESCRIPTION OF PRIOR ART

The Internet is the largest single repository of information in the history of humankind. It includes hundreds of millions of web sites (containing one or more web pages) with information on virtually every topic imaginable. Most people use search engines to locate information on a desired topic. A variety of search engine technologies have been proposed, including those discussed in U.S. Pat. No. 5,920,854, granted to Kirsch, et al. on Jul. 6, 1999, and U.S. Pat. No. 6,366,907, granted to Fanning, et al. on Apr. 2, 2002. The user types in one or more words, called keywords, and the search engine returns a list of web pages (and sometimes the containing site) that the engine deems relevant to the keyword(s), usually in page order from most to least relevant. This list often includes hundreds or even thousands of web sites and pages. The pages at the top of the list returned by the search engine in response to a search are the easiest and most convenient to access, and are therefore accessed by users with greater frequency than pages located nearer to the bottom of the list.

Most if not all web site owners and operators seek to maximize the number of users who access their web site. In the case of web sites offering products or services for sale, it is obviously desirable for the web site to be located as close as possible to the top of the list of search engine results for a search relevant to the site's content for maximum exposure to the most users. Web sites exposed to more users have more chances to convert a user. Conversion is when the user initiates an action of consumer significance on a web site, such as providing information to a web site host, making a purchase, requesting information, contacting someone at the web site sponsor, or requesting such contact information. For example, web sites that receive revenue from advertisers each time a user accesses an advertising banner on the site (usually by clicking it with a mouse) seek to maximize site exposure to users and also maximize the number of users converted by clicking on an advertising banner. Increasing the relevance ranking a web page is assigned by search engines is a high priority for a web site owner.

Search engines take many factors into consideration when determining the relevance of a web page. Known search engines have one or more rules involving the location and frequency of keywords on a web page. If a certain word appears in certain locations on the page and occurs frequently enough, the engine will assign "relevant" or even "highly relevant" ranking to the page for the word when used in a keyword search. Many search engines currently weigh the title of a web page very strongly in determining relevance. Many search engines also favor text found at or near the top of the page. The keyword density (the ratio of the number of times the keyword appears to the total number of words appearing on the web page) as well as the total number of times the keyword appears are also factors in evaluating relevance.

Some search engines give added weight to web pages with the keywords that are meta-tagged. Meta-tags are commands inserted into a web page that provide information about the web page. Tags are used by most format specifications that store documents as text files, including Standard Generalized Markup Language (SGML) and HyperText Markup Language (HTML). There are several types of meta-tags, but the most important for purposes of search engine indexing are the title, description and keyword tags. The title tag contains the title of the web page. The web site owner uses the description tag to return a suggested description of the page to the search engine in place of or in addition to the summary the search engine would ordinarily create for the page. The keyword tag provides a list of one or more words the site owner desires search engine to associate with the page. What is usually more important than the use of meta-tags is the use of the keyword in the title of the page and repeating the keyword frequently, but naturally, at the top of the body of text, and then throughout the body of text at periodic intervals.

Many other factors are also taken into account by the search engine when it ranks a page. In general, however, there tends to be a positive correlation between keyword density and amount of keyword dense content on the web page and relevance ranking assigned to the page by the search engine in searches for the keyword. Therefore, if one wants to drive targeted search engine traffic to a web site, it is desirable to create a lot of content on a page of the site which is keyword dense for a desired word. While content is any form of data including text, graphics, and sounds that is accessible by the user, spiders currently only recognize textual content. The process of designing a web page with the goal of ensuring that it will be deemed highly relevant to one or more desired keywords is known as search engine optimization (SEO).

One common practice in SEO is creating content to be keyword dense for a predetermined word or words, then using the word(s) in the page title and the description and keyword tags. The largest cost in this practice is associated with creating the content. A common practice in SEO to reduce the cost of creating content is keyword stuffing a web page, particularly a web page which is visible to search engines, but not to end users. Keyword stuffing is repeating a keyword over and over again on a page (thereby increasing keyword density and amount of keyword dense content on the page) without providing any useful content to the end user. Search engines utilize algorithms to detect and penalize the practice of keyword stuffing by reducing the relevance rating of the page or by removing it from the listing altogether. Techniques for creating keyword dense content for a website without keyword stuffing, such as keyword optimized copywriting, are laborious and expensive.

Message boards are commonly known in the prior art. One example is U.S. Pat. No. 6,363,427 issued to Tiebel, et al. on Mar. 26, 2002 (incorporated by reference). Message board (or bulletin board system) as used herein refers to an electronic message center. The message centers are provided by a web site host for users to post comments, questions, and other feedback in response to website content or posts from other users. Popular examples include message boards maintained on the Internet by Yahoo! Inc. allowing users to post messages pertaining to different publicly traded companies and to news articles. Some bulletin boards include a moderator, which is a person who reviews the posts to ensure that they are appropriate, and removes the posts that are not appropriate; some moderation may be performed by software. Users can access the board, locate the thread, as defined herein, that interests them, read messages (or posts) left by other users, and leave their own response if they so desire. A "thread" is an initial topic of discussion and any responses to it. Links to the topic and responses may be sorted chronologically on a web page or pages to facilitate reading all linked messages in order. Users may select links that interest them from a listing of thread or topic names available, and the links bring up the thread or topic corresponding to the link selected.

Known message boards in the prior art are usually not included in lists of search engine results. One reason is that the host web site does not make display page easily accessible to spiders. Another reason is that message boards are often run using databases which group information together in order to display the message board content to users. These databases are designed for users to be able to interact and discuss topics, and so the databases do not have the built-in capacity to store meta-information (such as meta title, keyword, and description tags) which aids the search engine spider in determining the relevance of each thread. In addition, although the individual messages posted to the message boards are displayed on web pages, known web pages displaying the messages do not make use of meta-tags which are specific to each thread or topic to further enhance the keyword-based appeal of message board messages to a search engine; nor do many of them display more than one message body on each page, which results in less keyword dense content on each page. Furthermore, moderators do not review the posts for keyword density or other factors affecting a relevance rating.

Web sites commonly provide one or more e-mail addresses for users to send feedback to the site owner. The owner may review the e-mails, and may respond or display them on a web page of the site as testimonial advertising for other users to view. As with message boards, there is no coordination of web page design and user email content and no attempt to include content on the site designed to elicit feedback that is relevant to a predetermined word or words.

Some web sites include a textual "chat room." Prior-art chat rooms provide users with access to real-time means of displaying user feedback typed back and forth between different users. Users can view feedback submitted from other users, usually from the time the user entered the chat room. While chat room feedback may be archived, chat room feedback is usually only available transiently to users, and is not made available to search engines.

BRIEF SUMMARY OF THE INVENTION

It is an object of the present invention to reduce the costs associated with generating keyword dense content for a web site.

It is also an object of the present invention to optimize the search engine rankings of a web site, and to reduce the costs associated with optimization.

To achieve these and other related objects, the present invention provides a method and system of search engine optimization that includes generating content for web sites and optimizing the search engine rankings for the web pages displaying the content. An embodiment of the invention is a web site with content designed to elicit responses from users that contain keyword dense content or other relevance-increasing content for a chosen word or words. Users submit responses to the website and the website displays the responses on a web page.

Another embodiment of the invention comprises a web site including a message board and at least one web page displaying the user posts to the message board. The message board has at least one topic designed to elicit user responses that are relevant for a particular word when the word is used in a keyword search. Users submissions are displayed on a web page. These embodiments may also include a display page that is optimized for the word.

Another embodiment comprises a web site including content designed to generate user responses that are relevant for a word or words, and an email address for users to send the feedback to the owner. The site also includes a feedback display page optimized for the word(s).

Another embodiment comprises a web site including content designed to generate user feedback that is relevant for a word or words, and a chat room for users to submit responses and read the responses of other users. The feedback is archived and displayed on an optimized web page.

In further embodiments the invention includes ways for users to convert from the display page, such as a navigation interface integrated in the display page. The interface informs the user that the message board page is part of a larger website and/or facilitates conversion from the message board, and/or allows easy access to the other parts of the web site. The invention may also include a moderator that reviews user submissions for appropriateness, relevance, or other factors when determining whether to display submissions or remove them from the display page. The moderator may be a person or software.

These together with other objects and advantages which will be subsequently apparent, reside in the details of construction and operation as more fully hereinafter described and claimed, with reference to the accompanying drawings forming a part hereof, wherein like numerals refer to like elements throughout. The drawings are intended only to illustrate or exemplify an embodiment of the invention claimed herein, and are not intended to act as limitations of any of the claims.

BRIEF DESCRIPTION OF THE DRAWINGS

FIG. 2 is an illustration of an example feedback display page.

DETAILED DESCRIPTION OF THE PREFERRED EMBODIMENTS

Figure 1:
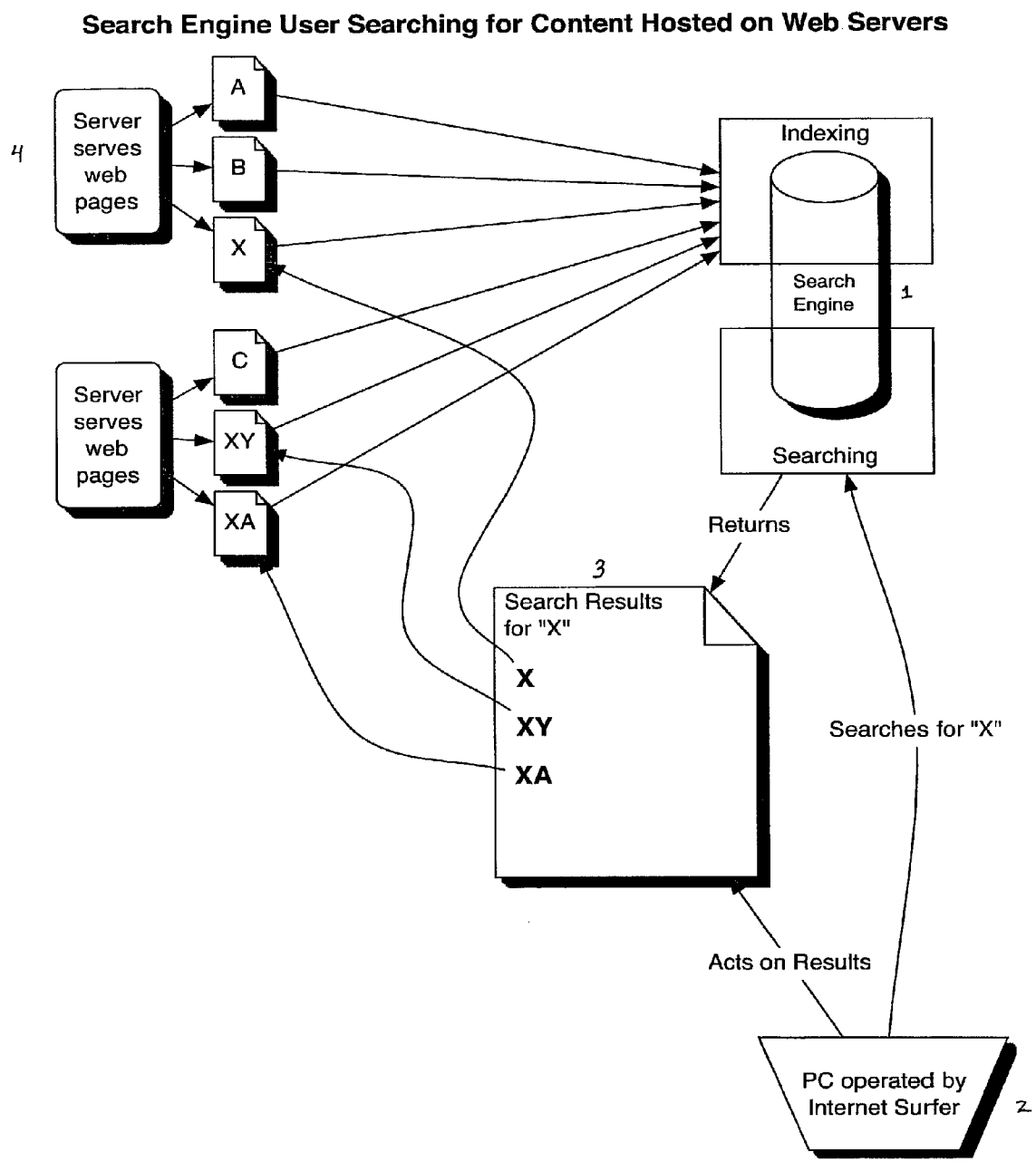
FIG. 1 is a conceptual drawing of the Internet.

Now turning to the drawings, and more particularly to FIG. 1 thereof, it will be observed that it depicts a conceptual drawing of a portion of a computer network. The network will be referred to as the Internet hereinafter, but it should be understood that it could be any computer network, such as a local area network (LAN) or a wide area network (WAN). A user accesses one of multiple search engines 1 via, for example, a personal computer 2 executing a web browser program such as Navigator or Explorer. Examples of search engines include the Google and Altavista engines. The user types in a word or words to be searched, and in response to the user's keyword search, the search engine 1 returns a list 3 of relevant results including a web page of a website utilizing the present invention residing on server 4. A server is a computer system that is remotely accessible to other computers. The server provides information in response to requests from other computers on the Internet.

An embodiment of the invention is a web site including content designed to elicit responses from users that contain keyword dense content or other relevance-increasing content for a chosen word or words. The chosen word is a word the site owner wants his site to receive a high relevance ranking for when the word is used in a keyword search. The content designed to elicit responses may consist of information about a product and questions or issues about the product.

For example, a web site owner selling widgets may, with the help of common sense, market analyses or consumer survey results, choose words such as "widget" and "widget sales" as words that users seeking information on widgets would likely use for keyword searches on the subject and therefore determine that his website should have a high relevance ranking with respect to the words. The owner might display informative articles or differing points of view on the subject of which widgets are the best. Various incentives might be offered to users who submit feedback. For example, a stock market-related site may offer measures of market performance as the response-eliciting content. The site may offer real-time quotes to those users who contribute relevant feedback or do so on a consistent basis.

The website owner receives submissions and displays any responses thereto. As more users read the topic and the displayed responses, they also submit responses. As more responses are submitted to the owner, more responses are displayed on the site. This practice increases the amount of relevant content on the site for a very small investment of time and money on the part of the site owner, particularly if the posting of responses to the site is handled in an automated manner which requires no maintenance by the owner.

Another consideration is that of facilitating the ability of search engine spiders to crawl the links in the host website to the pages which display the web content. Spiders are often programmed to avoid Uniform Resource Locators (URLs) with certain formats, such as URLs incorporating a query string. If the display pages are referenced by such URLs which are not "spider friendly," it will impede the spiders from indexing these pages and will render moot the existence of the keyword-rich content on these pages. Therefore, the pages should be referenced with "spider friendly" URLs to ensure that spiders can easily crawl the display pages. Since different spiders have different "preferences" as to what they will and will not crawl, there are known strategies in the art for facilitating spider crawling, including but not limited to best practices in link structures and the elimination of query strings. Using the example of query strings as a "spider unfriendly" URL format, there are many options that are known in the art to avoid this problem, such as using static HTML pages rather than dynamically generated pages, or encoding the URL into a format which is acceptable to spiders.

In another embodiment, the web site owner may include content designed to elicit relevant feedback and additionally optimize a display page for the word(s). In the example, the words "franchise" and "franchisee" might be included in the title, the description tag, and the keyword tag of the page. The coordination of the display page design and the response-generating content of the website may provide user feedback that is dense for a given word and keyword dense in one or more of the keywords on the optimized display page.

Other embodiments may also include a message board or bulletin board as the means for users to submit feedback. Bulletin board software may be obtained from many sources, including vBulletin, ZeroSoft, Ultimate Bulletin Board, and Bulletin Board Corporation. The display page may include a link to a login page, where users may have to submit data such as a name, telephone number, email address, or other information. After logging in, users may be allowed to access a submission page to allow users to submit feedback. The submission page may include a form to be completed by the user. The form may include name, subject, and message body fields. In the subject field, the message board may be programmed to insert a pre-determined entry corresponding to the thread the user is posting. The entry may include the desired word or keyword, which may increase the keyword density of the submission. The user may be able to edit the subject field. The board may automatically display submissions on the display page or may hold the submissions for review before displaying them. The board may display multiple submissions on the same page. This method of display may increase the keyword density or the amount of keyword-dense text on a display page, especially compared to the one-post-per-page practice of many prior art bulletin boards.

The display page may also include a navigation interface. The interface may be separated from the displayed responses by frames, or be integrated into the body of responses. The interface may facilitate conversion of the user from the display page. The interface may facilitate conversion by including, for example, "Next" and "Previous" links to adjacent pages of the site, a list of links to other pages of the site, links to pages which sell or provide further information about the topic of discussion, or a notice of the existence and purpose of the rest of the site.

One example of a display page is shown in FIG. 2. The display page is optimized for "widgets." The title 5, description 6, and keyword 7 tags all include the word widget as well as variations and combinations of the word. The page includes various conversion links 8-10. One of the links 8 provides an opportunity to buy widgets at a discount. Another link 9 allows a user to sign up for a widget newsletter. A third link 10 allows users to search the rest of the site for widgets. There are also links 11-15 to further information about specific widgets, such as green, blue, red, small and large widgets. The message board-thread 16 and user posts are also displayed on the page. Keywords used in posts may be in bold type. Underlined words may be links to more information or conversion opportunities. The thread 16 may also contain links 17-19 for users to post replies, login or register, or view other discussion topics. When deciding what content to include on a display page, the owner should keep in mind that the display page is the page that will be included in search engine results lists, and therefore will probably be the page of the site most viewed by users.

Other embodiments may provide users with one or more site e-mail addresses as a means of submitting feedback. Users may also be provided with access to a chat room as a means of submitting feedback. In the case of a chat room, the previous submissions displayed would allow users entering the chat room to familiarize themselves with the thread of the feedback before submitting his own feedback. This practice may increase the relevance of user submissions. In each case, individual submissions may be posted on a display page to increase the relevance of the page for a given word. Further embodiments may provide a chat room for users to submit feedback, archive the feedback, and display it on a display page.

Embodiments may also comprise a moderator. A moderator may be a person or piece of software, such as a text-editor. The moderator may review the user submissions for relevance or appropriateness. Off-topic submissions or those including profanity do not have to be displayed or can be edited before being displayed. The moderator might also insert links into the text of the submissions where appropriate. Submissions that include desired keywords or are otherwise particularly relevant might be included and/or the submitter otherwise rewarded. The moderator may respond to user submissions, provide information, or answer questions by post, e-mail, or chat response.

The many features and advantages of the invention are apparent from the specification, and thus, it is intended by the inventor that the appended claims cover all such features and advantages of the invention that fall within the true scope and spirit of the invention. Further, since numerous variations and modifications will be readily apparent to those of skill in the art, the inventor does not desire to limit the invention to the exact embodiments illustrated and described herein, and accordingly, all suitable modifications and equivalents may be resorted to, falling within the scope of the invention.

We claim:

1. A method for managing, by a computer, a web site containing content related to a subject, said method comprising:
   publishing on the web site content relating to the subject;
   providing a text entry field for submitting user created content to the site;
   receiving the user created content from a user through the text entry field;
   analyzing, by the computer, the received user created content for at least one keyword associated with the subject;
   moderating the user created content by automatically checking the user created content for forbidden words;
   prompting the user to edit the user created content if the forbidden words are found in the user created content; and
   publishing, by the computer, on the web site the received user created content if the keyword is found in the submission, wherein the publishing results in an improvement of the web site's ranking resulting from a search of the subject conducted by a search engine.

2. The method of claim 1, wherein the moderating further comprises human review of the user created content.

3. The method of claim 2, wherein the human review further comprises removing user created content that does not pass the human review.

4. The method of claim 1, wherein user created content is automatically removed when forbidden words are found in the user created content.

5. The method of claim 1, wherein user created content is automatically edited to remove forbidden words when the forbidden words are found in the user created content.

6. The method of claim 1, wherein providing a text entry field further comprises providing message board software.

7. The method of claim 1, wherein providing a text entry field further comprises providing chat room software.

8. The method of claim 1, wherein the user created content further comprises feedback to the site.

9. The method of claim 1, wherein the user created content further comprises a Uniform Resource Locator.

10. The method of claim 1, wherein the user created content further comprises an advertisement.

11. The method of claim 1, wherein the receiving the user created content further comprises receiving an e-mail message.

12. The method of claim 1, wherein the receiving the user created content further comprises creating a database entry.

13. The method of claim 1, wherein providing a text entry field further comprises requesting the user to submit content to the site.

14. A method for managing, by a computer, a web site containing content related to a subject, said method comprising:
    publishing on the web site content relating to the subject;
    providing a text entry field for submitting user created content to the site;
    querying web site users to submit user created content to the site;
    receiving the user created content from a user through the text entry field;
    analyzing, by the computer, the received user created content for at least one keyword associated with the subject;
    moderating the user created content by automatically checking the user created content for forbidden words;
    prompting the user to edit the user created content if the forbidden words are found in the user created content; and
    publishing, by the computer, on the web site the received user created content if the keyword is found in the submission, wherein the publishing results in an improvement of the web site's ranking resulting from a search of the subject conducted by a search engine.

15. The method of claim 14, wherein providing a text entry field further comprises providing message board software.

16. The method of claim 14, wherein providing a text entry field further comprises providing chat room software.

17. The method of claim 14, wherein the user created content further comprises a Uniform Resource Locator.

18. A method of managing, by a computer, a web site containing content related to a subject, the method comprising:
    providing a text entry field for submitting user created content to the site;
    receiving the user created content from a user through the text entry field;
    analyzing, by the computer, the received user created content for at least one keyword associated with the subject;
    moderating the user created content by automatically checking the user created content for forbidden words;
    prompting the user to edit the user created content if the forbidden words are found in the user created content; and publishing, by the computer, on the web site the received user created content if the keyword is found in the submission, wherein said publishing results in an improvement of the web site's ranking resulting from a search of the subject conducted by a search engine.

19. The method of claim 18, wherein providing a text entry field further comprises providing message board software.

20. The method of claim 18, wherein providing a text entry field further comprises providing chat room software.

* * * * *